(12) United States Patent
Liu et al.

(10) Patent No.: US 11,420,341 B2
(45) Date of Patent: Aug. 23, 2022

(54) FIVE-DEGREE-OF-FREEDOM PARALLEL MECHANISM AND ITS EXTENDED EQUIPMENT

(71) Applicant: Tsinghua University, Beijing (CN)

(72) Inventors: Xinjun Liu, Beijing (CN); Qizhi Meng, Beijing (CN); Fugui Xie, Beijing (CN); Weiyao Bi, Beijing (CN); Fei Qiao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 354 days.

(21) Appl. No.: 16/632,485

(22) PCT Filed: Oct. 11, 2017

(86) PCT No.: PCT/CN2017/105687
§ 371 (c)(1),
(2) Date: Jan. 20, 2020

(87) PCT Pub. No.: WO2019/071465
PCT Pub. Date: Apr. 18, 2019

(65) Prior Publication Data
US 2020/0230826 A1    Jul. 23, 2020

(51) Int. Cl.
*B25J 17/02* (2006.01)
*B25J 5/00* (2006.01)
*B25J 9/00* (2006.01)

(52) U.S. Cl.
CPC .......... *B25J 17/0283* (2013.01); *B25J 5/00* (2013.01); *B25J 9/0063* (2013.01); *B25J 17/0266* (2013.01)

(58) Field of Classification Search
None
See application file for complete search history.

(56) References Cited

U.S. PATENT DOCUMENTS

2005/0001368 A1* 1/2005 Schwaar .............. B23Q 1/5462
409/235

OTHER PUBLICATIONS

WIPO, ISR for PCT/CN2017/105687, Jun. 12, 2018.

* cited by examiner

*Primary Examiner* — Ronald P Jarrett
(74) *Attorney, Agent, or Firm* — Hodgson Russ LLP (57) ABSTRACT

A five-degree-of-freedom parallel mechanism and a series-parallel multi-degree-of-freedom equipment having the parallel mechanism are disclosed, and can machine complex components and parts as well as large structural parts and implement multi-degree-of-freedom numerical control machining, such as offsite maintenance of large equipment. The parallel mechanism includes: a rack; a movable platform; a first chain connected with the rack by at least two revolute pairs with axes intersecting with each other perpendicularly, and connected with the movable platform by at least two revolute pairs with axes intersecting with one another perpendicularly; a second chain having the same structure as the first chain; and a third chain including a main branch chain and two auxiliary branch chains, wherein the first chain, the second chain, and the third chain are separately connected between the rack and the movable platform.

16 Claims, 9 Drawing Sheets

FIVE-DEGREE-OF-FREEDOM PARALLEL MECHANISM AND ITS EXTENDED EQUIPMENT

CROSS-REFERENCE TO RELATED APPLICATIONS

The application is a U.S. national phase application of International Application PCT/CN2017/105687, filed on Oct. 11, 2017, the entire disclosure of which is incorporated herein by reference.

FIELD

The present disclosure relates to a field of mechanical design and mechanical manufacturing technology, and particularly to a five-degree-of-freedom parallel mechanism and multi-degree-of-freedom equipment including the parallel mechanism.

BACKGROUND

In the related art, with the development of industrial level in the mechanical design and manufacturing field, the service requirements for and design level of mechanical parts have been continuously raised, and machining and manufacturing processes of mechanical parts also become more demanding and complex, posing new challenges to modern machining equipment. In order to improve rotational flexibility, compliance, efficiency and accuracy of machining, the machining equipment should have a machining capacity with at least five degrees of freedom, and good static and dynamic characteristics, and meanwhile, a condition that five sides are machined with a single clamping action (a workpiece can be machined by a cutting tool in any direction without replacing a fixture or being re-clamped) is required to be met under harsh working conditions. With the implementation of major national projects, large complex structural parts and large equipment have been widely applied to various key areas, such as aerospace, ships and warships, power facilities, or the like. For machining of such structural parts, obviously, the traditional mindset that a "small" workpiece is machined by a "large" machine tool is no longer applicable. Furthermore, later maintenance of the large equipment is an arduous task, and depot repair not only involves lots of work and is time-consuming, but also is prone to causing secondary damage.

The machining equipment in the related art is mostly implemented in series, and has problems, such as error accumulation, large mass of movement components, and the like. Unlike the serial mechanism, a parallel mechanism is a closed loop composed of two or more kinematic chains and is able to control a terminal to realize a certain output motion. Due to the advantages of a compact structure, small mass of movement components, high rigidity, good dynamic response characteristic, a large bearing capacity per unit weight, and easy implementation of high speed movement, the parallel mechanism becomes an ideal option for modular design. In recent years, deficient DOF parallel mechanisms are more and more valued and favored by researchers due to their characteristics, such as easy realization of a large work space, and convenience for modularization. A 5-DOF (degree of freedom) parallel mechanism is a very important type of deficient DOF parallel mechanisms, but configuration synthesis of such mechanisms with practical value is challenging, and for this reason, there are very few successful application cases of the 5-DOF parallel mechanisms.

Currently, the 5-DOF full parallel equipment having the best application effect is a series of 5-DOF equipment developed by Metrom Company (Germany), such as PM1400. Furthermore, there is also a series of five-axis series-parallel machining equipment developed based on a 3-DOF parallel mechanism, such as Ecospeed, Tricept, and Exechon.

Although the above-mentioned products are applied successfully, there remain some crucial technical problems to be solved, such as kinematic and structural complexity and rigidity caused by five chains, and severe dependence of the series-parallel equipment on accuracy of a swing head.

SUMMARY

The present disclosure seeks to solve at least one of the problems existing in the related art. To this end, the present disclosure proposes a five-degree-of-freedom parallel mechanism, and further proposes series-parallel multi-degree-of-freedom equipment having the parallel mechanism, which can machine complex components and parts as well as large structural parts and implement multi-degree-of-freedom numerical control machining, such as offsite maintenance of large equipment.

The parallel mechanism according to embodiments of the present disclosure includes: a rack; a movable platform; a first chain connected with the rack by at least two revolute pairs with axes intersecting with each other perpendicularly, and connected with the movable platform by at least two revolute pairs with axes perpendicular to each other; a second chain having the same structure as the first chain, and connected with the rack by at least two revolute pairs with axes intersecting with each other perpendicularly and connected with the movable platform by at least two revolute pairs with axes perpendicular to each other; and a third chain including a main branch chain and two auxiliary branch chains. The main branch chain is connected with the movable platform by a revolute pair and connected with the rack by three revolute pairs with axes intersecting with one another. Each of the auxiliary branch chains is connected with the main branch chain by at least two revolute pairs with axes intersecting with each other perpendicularly, and is connected with the rack by at least two revolute pairs with axes intersecting with each other perpendicularly. The first chain, the second chain, and the third chain are separately connected between the rack and the movable platform, and constitute, together with the rack and the movable platform, a spatial parallel mechanism that enables the movable platform to realize three rotational degrees of freedom and two movement degrees of freedom.

The parallel mechanism according to the embodiment of the present disclosure can be developed into the series-parallel multi-degree-of-freedom equipment which can machine complex components and parts as well as large structural parts and implement multi-degree-of-freedom numerical control machining, such as offsite maintenance of large equipment.

In addition, the five-degree-of-freedom parallel mechanism according to the embodiments of the present disclosure can further have the following additional technical features.

According to one embodiment of the present disclosure, each of the first and second chains includes: a first rod having one end connected with the movable platform by two revolute pairs successively and the other end connected with the rack by three revolute pairs with axes intersecting with one another; and a first sleeve fitted over the first rod and connected with the rack by two revolute pairs with axes intersecting with each other perpendicularly, wherein the first rod is movable and rotatable along the first sleeve.

According to one embodiment of the present disclosure, each of the first and second chains further includes: a first rotating member provided with a first pivot axis and a second pivot axis perpendicular to each other, the first pivot axis being rotatably connected with the movable platform; and a first U-shaped connecting member having two legs rotatably connected with the second pivot axis, the first rod being fixedly connected with the first U-shaped connecting member.

According to another embodiment of the present disclosure, each of the first and second chains includes: a first rod having one end connected with the movable platform by three revolute pairs successively and the other end connected with the rack by two revolute pairs with axes intersecting with each other perpendicularly; and a first sleeve fitted over the first rod and connected with the rack by two revolute pairs with axes intersecting with each other perpendicularly, wherein the first rod is movable along the first sleeve.

According to another embodiment of the present disclosure, each of the first and second chains further includes: a first rotating member provided with a first pivot axis and a second pivot axis perpendicular to each other, the first pivot axis being rotatably connected with the movable platform; and a first U-shaped connecting member having two legs rotatably connected with the second pivot axis, the first rod being rotatably connected with the first U-shaped connecting member.

According to one embodiment of the present disclosure, each of the first and second chains further includes: a first collar fitted over the first sleeve and connected with the first sleeve by a revolute pair, the rack being provided with a first fixed ring, and the first collar being provided in the first fixed ring and concentric with the first fixed ring, and the first collar being connected with the first fixed ring by a revolute pair.

According to one embodiment of the present disclosure, the main branch chain in the third chain includes: a second rod having one end connected with the movable platform by a revolute pair and the other end connected with the rack by three revolute pairs with axes intersecting with one another; a second sleeve fitted over the second rod and connected with the rack by two revolute pairs with axes intersecting with each other perpendicularly, wherein the second rod is movable and rotatable along the second sleeve; and a second collar fitted over the second sleeve and connected with the second sleeve by a revolute pair, wherein the rack is provided with a second fixed ring, and the second collar is provided in the second fixed ring and concentric with the second fixed ring and is connected with the second fixed ring by a revolute pair.

According to one embodiment of the present disclosure, each of the auxiliary branch chains in the third chain includes: a third rod having one end connected with the second rod by two revolute pairs with axes intersecting with each other perpendicularly and the other end connected with the rack by three revolute pairs with axes intersecting with one another; and a third sleeve fitted over the third rod and connected with the rack by two revolute pairs with axes intersecting with each other perpendicularly, wherein the third rod is movable and rotatable along the third sleeve.

According to one embodiment of the present disclosure, each of the auxiliary branch chains in the third chain includes: a third rod having one end connected with the second rod by three revolute pairs with axes intersecting with one another and the other end connected with the rack by two revolute pairs with axes intersecting with each other perpendicularly; and a third sleeve fitted over the third rod and connected with the rack by two revolute pairs with axes intersecting with each other perpendicularly, wherein the third rod is movable along the third sleeve.

According to one embodiment of the present disclosure, each of the auxiliary branch chains in the third chain includes: a third collar fitted over the third sleeve and connected with the third sleeve by a revolute pair, the rack being provided with a third fixed ring, and the third collar being provided in the third fixed ring and concentric with the third sleeve and being connected with the third sleeve by a revolute pair.

The multi-degree-of-freedom equipment according to embodiments of the present disclosure includes: a mounting frame; and the above parallel mechanism provided on the mounting frame, wherein the mounting frame is connected with the parallel mechanism in series to constitute the multi-degree-of-freedom equipment, so as to enable the movable platform obtain more than five degrees of freedom.

Additional aspects and advantages of the present application will be given in part in the following descriptions, become apparent in part from the following descriptions, or be learned from the practice of the embodiments of the present disclosure.

BRIEF DESCRIPTION OF THE DRAWINGS

The above-mentioned and/or additional aspects and advantages of the present disclosure will become apparent and more readily appreciated from the following descriptions of the embodiments made with reference to the drawings, in which.

REFERENCE NUMERALS five-degree-of-freedom parallel mechanism 100;
rack 10;
first fixed ring 11; second fixed ring 12; third fixed ring 13;
movable platform 20;
first chain 30; first rod 31; first sleeve 32; first rotating member; first U-shaped connecting member 34; first collar 35;
second chain 40;
third chain 50; main branch chain 51; second rod 511; second sleeve 512; second collar 513; auxiliary branch chain 52; third rod 521; third sleeve 522; third collar 523; third rotating member 524; third U-shaped connecting member 525;
multi-degree-of-freedom equipment 600;
mounting frame 60; frame structure 61; floor stand 62; revolving platform 63; cantilever beam 64; flange structural part 65; slide block 66; slide rail 67.

DETAILED DESCRIPTION

Embodiments of the present application will be described in detail below, and the examples of the embodiments will be illustrated in the drawings, wherein the same or similar elements and the elements having same or similar functions are denoted by like reference numerals throughout the descriptions. The embodiments described herein with reference to the drawings are illustrative, and merely used to explain the present application. The embodiments shall not be construed to limit the present application.

In the description of the present application, it is to be understood that terms such as "central," "upper," "lower," "vertical," "horizontal," "axial" and the like should be construed to refer to the orientation as then described or as shown in the drawings under discussion. These relative terms are for convenience and simplification of description and do not indicate or imply that the device or element referred to must have a particular orientation, or be constructed and operated in a particular orientation, so these terms shall not be construed to limit the present application. Furthermore, the feature defined with "first" and "second" may include one or more of this feature explicitly or implicitly. In the description of the present disclosure, "a plurality of" means two or more than two, unless otherwise stated.

In the description of the present disclosure, it should be noted that unless specified or limited otherwise, the terms "mounted," "connected," "coupled," and the like are used broadly, and may be, for example, fixed connections, detachable connections, or integral connections; may also be mechanical connections or electrical connections; may also be direct connections or indirect connections via intervening structures; may also be inner communications of two elements, which can be understood by those skilled in the art according to specific situations.

A five-degree-of-freedom parallel mechanism 100 according to embodiments of a first aspect of the present disclosure will be described below with reference to FIGS. 1 to 9.

As shown in FIGS. 1 to 9, the five-degree-of-freedom parallel mechanism according to the embodiments of the present disclosure includes a rack 10, a movable platform 20, a first chain 30, a second chain 40, and a third chain 50.

The first chain 30 is connected with the rack 10 by at least two revolute pairs with axes intersecting with each other perpendicularly, and is connected with the movable platform 20 by at least two revolute pairs with axes perpendicular to each other. The term "revolute pair" refers to a pair of relatively rotatable members, defining a pivot axis therebetween.

Specifically, two or three revolute pairs can be provided at a joint between the first chain 30 and the rack 10. When two revolute pairs are provided between the first chain 30 and the rack 10, axes of the two revolute pairs intersect with each other perpendicularly, and while rotating with respect to one of the revolute pairs, the first chain 30 is rotatable with respect to the other one of the revolute pairs. When three revolute pairs are provided between the first chain 30 and the rack 10, axes of the three revolute pairs intersect with one another, and the third revolute pair between the first chain 30 and the rack 10 can be formed when the first chain 30 rotates around a central axis thereof.

As shown in FIGS. 1 to 9, two or three revolute pairs can be provided at a joint between the first chain 30 and the movable platform 20. When two revolute pairs are provided between the first chain 30 and the movable platform 20, axes of the two revolute pairs are perpendicular to each other, and while rotating with respect to one of the revolute pairs, the first chain 30 is rotatable with respect to the other one of the revolute pairs. When three revolute pairs are provided between the first chain 30 and the movable platform 20, the third revolute pair between the first chain 30 and the movable platform 20 can be formed when the first chain 30 rotates around the central axis thereof.

The second chain 40 has the same structure as the first chain 30. The second chain 40 is connected with the rack 10 by at least two revolute pairs with axes intersecting with each other perpendicularly, and is connected with the movable platform 20 by at least two revolute pairs with axes perpendicular to each other.

The third chain 50 includes a main branch chain 51 and two auxiliary branch chains 52, wherein the main branch chain 51 is connected with the movable platform 20 by a revolute pair and is connected with the rack 10 by three revolute pairs with axes intersecting with one another. Each of the auxiliary branch chains 52 is connected with the main branch chain 51 by at least two revolute pairs with axes intersecting with each other perpendicularly, and is connected with the rack 10 by at least two revolute pairs with axes intersecting with each other perpendicularly. In other words, each auxiliary branch chain 52 is connected with the main branch chain 51 by two or three revolute pairs, and is connected with the rack 10 by two or three revolute pairs.

The first chain 30, the second chain 40, and the third chain 50 are separately connected between the rack 10 and the movable platform 20, and constitute, together with the rack 10 and the movable platform 20, a spatial parallel mechanism that enables the movable platform 20 to realize three rotational degrees of freedom and two movement degrees of freedom.

For the five-degree-of-freedom parallel mechanism 100 according to the embodiments of the present disclosure, the rack 10, the movable platform 20, the first chain 30, the second chain 40, and the third chain 50 are provided; the first chain 30 is connected with the rack 10 by the at least two revolute pairs and is connected with the movable platform 20 by the at least two revolute pairs; the second chain 40 has the same structure as the first chain 30; the third chain 50 includes the main branch chain 51 and the two auxiliary branch chains 52, the main branch chain 51 is connected with the movable platform 20 by the revolute pair and is connected with the rack 10 by the three revolute pairs, and each auxiliary branch chain 52 is connected with the rack 10 by the at least two revolute pairs and is connected with the movable platform 20 by the at least two revolute pairs. Thus, the movable platform 20 realizes the three rotational degrees of freedom and the two movement degrees of freedom.

The five-degree-of-freedom parallel mechanism 100 according to specific embodiments of the present disclosure will be described in detail below with reference to FIGS. 1 to 9.

One embodiment of the first chain 30 and the second chain 40 according to the present disclosure will be described below.

Figure 1:
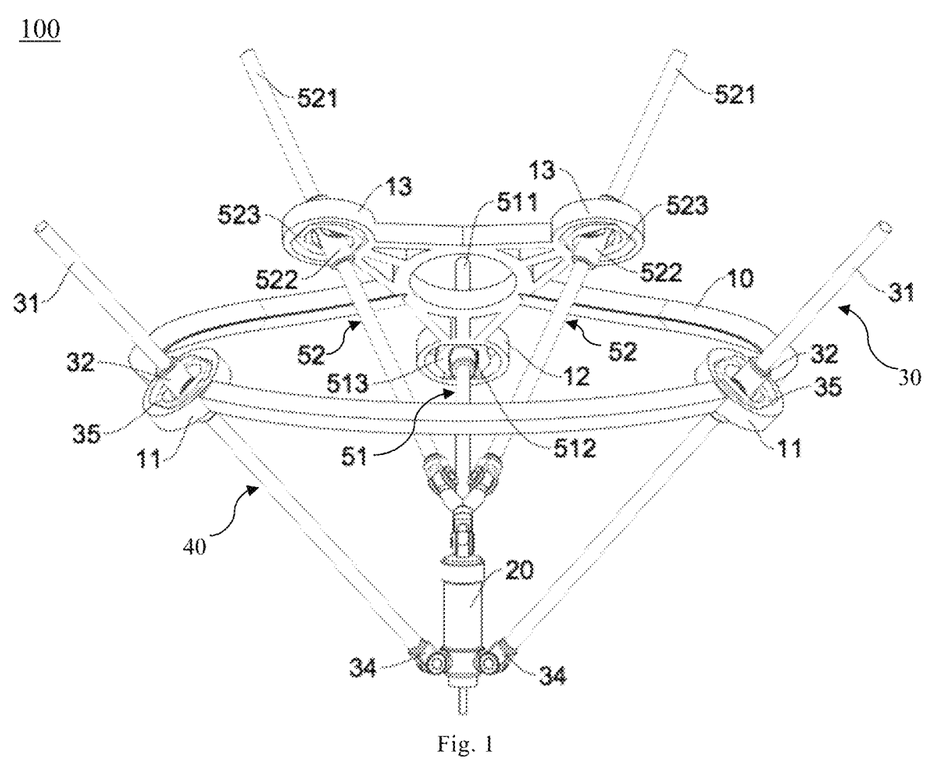
FIG. 1 is a schematic structural diagram of a five-degree-of-freedom parallel mechanism according to one embodiment of the present disclosure.
Figure 2:
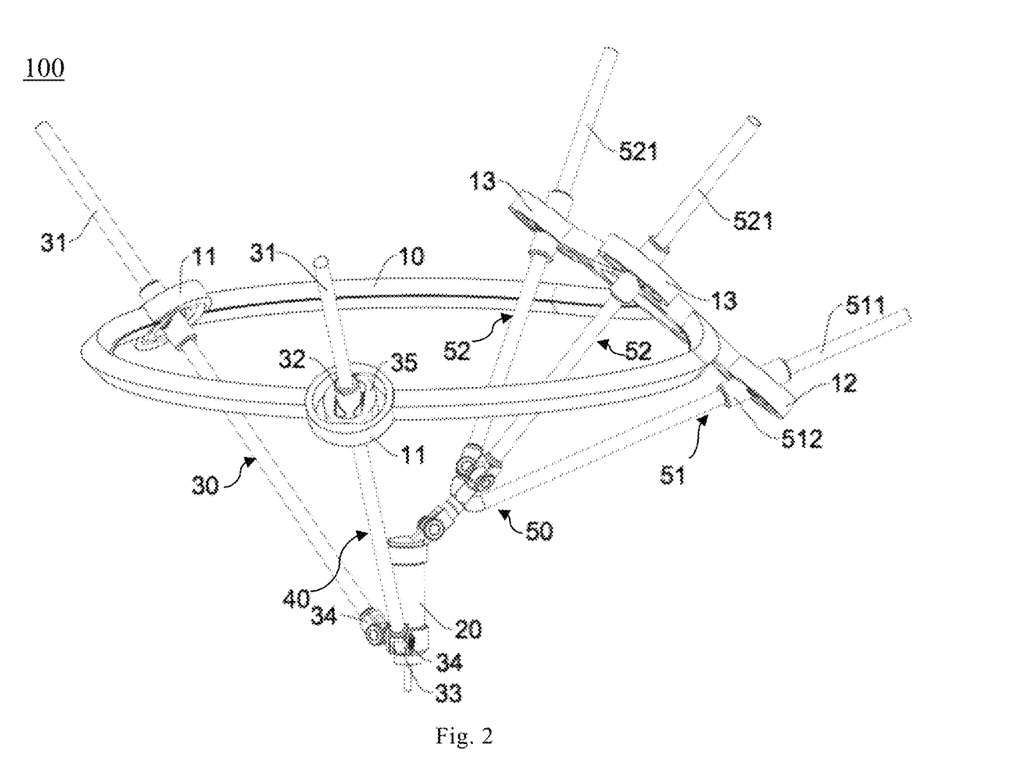
FIG. 2 is a schematic structural diagram of a five-degree-of-freedom parallel mechanism according to one embodiment of the present disclosure from another perspective.
Figure 3:
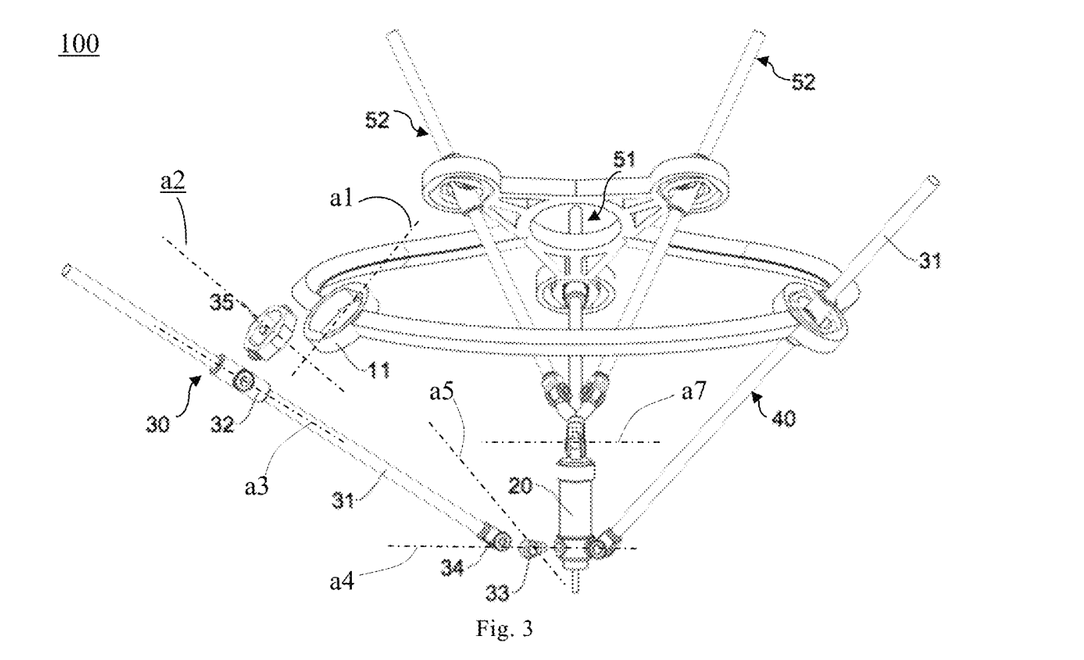
FIG. 3 is an exploded diagram of a first chain, a rack, and a movable platform of a five-degree-of-freedom parallel mechanism according to one embodiment of the present disclosure.

As shown in FIGS. 1 to 3, each of the first chain 30 and the second chain 40 includes a first rod 31 and a first sleeve 32. The first rod 31 has one end connected with the movable platform 20 by two revolute pairs with axes a4, a5 intersecting with each other perpendicularly and has the other end connected with the rack 10 by three revolute pairs with axes a1, a2, a3 intersecting with one another. The first sleeve 32 is fitted over the first rod 31 and connected with the rack 10 by two revolute pairs with axes intersecting with each other perpendicularly, in which the first rod 31 is movable and rotatable along the first sleeve 32.

Specifically, the first sleeve 32 is fitted over a joint of the first rod 31 and the rack 10; the first rod 31 can move in an extension direction of the first sleeve 32 and rotate about a central axis of the first sleeve 32; the central axis of the first sleeve 32 and a central axis of the first rod 31 are coaxially arranged; and the first sleeve 32 is connected with the rack 10 by two revolute pairs with axes intersecting with each other perpendicularly. Thus, the first rod 31 is connected with the rack 10 by three revolute pairs intersecting with one another perpendicularly, and has a good rotational effect relative to the rack 10.

Further, as shown in FIG. 3, each of the first chain 30 and the second chain 40 further includes: a first collar 35 fitted over the first sleeve 32 and connected with the first sleeve 32 by a revolute pair; the rack 10 is provided with a first fixed ring 11, and the first collar 35 is provided in the first fixed ring 11 and concentric with the first fixed ring 11; and the first collar 35 is connected with the first fixed ring 11 by a revolute pair. The first rod 31 is rotatable relative to the first sleeve 32, the revolute pair is formed between the first sleeve 32 and the first collar 35, the first collar 35 and the first fixed ring 11 form the revolute pair, and the first fixed ring 11 is fixed at the rack 10. Thus, by providing the first collar 35 and the first fixed ring 11, three revolute pairs with axes intersecting with one another are formed between the first chain 30 and the rack 10 and between the second chin 40 and the rack 10, and the structure is simple and convenient to assemble and disassemble, and has a good rotational effect.

Optionally, spherical hinges can replace the three revolute pairs with the axes intersecting with one another between the first chain 30 and the rack 10 and the three revolute pairs with the axes intersecting with one another between the second chain 40 and the rack 10.

As shown in FIG. 3, each of the first chain 30 and second chain 40 further includes a first rotating member 33 and a first U-shaped connecting member 34. The first rotating member 33 is provided with a first pivot axis and a second pivot axis intersecting perpendicularly, and the first pivot axis is rotatably connected with the movable platform 20. The first U-shaped connecting member 34 has two legs rotatably connected with the second pivot axis, and the first U-shaped connecting member 34 is fixedly connected with the first rod 31.

Specifically, the first U-shaped connecting member 34 is fixedly connected with the first rod 31 and is provided with the two legs. The two legs are rotatably connected with the first rotating member 33, and the axis around which the two legs rotate relative to the first rotating member 33 is the second pivot axis. The first rotating member 33 is rotatably connected with the movable platform 20, and the axis around which the first rotating member 33 rotates relative to the movable platform 20 is the first pivot axis. The first pivot axis intersects perpendicularly with a central axis of the movable platform 20, and the first pivot axis and the second pivot axis intersect with each other perpendicularly. Thus, by providing the first rotating member 33 and the first U-shaped connecting member 34, the two revolute pairs with the axes intersecting perpendicularly are formed between the first rod 31 and the movable platform 20, bringing about a good rotational effect.

Optionally, hooke hinges can replace the two revolute pairs with the axes intersecting with each other perpendicularly between the first chain 30 and the movable platform 20 and the two revolute pairs with the axes intersecting with each other perpendicularly between the second chain 40 and the movable platform 20.

Another embodiment of the first chain 30 and the second chain 40 according to the present disclosure will be described below.

Figure 4:
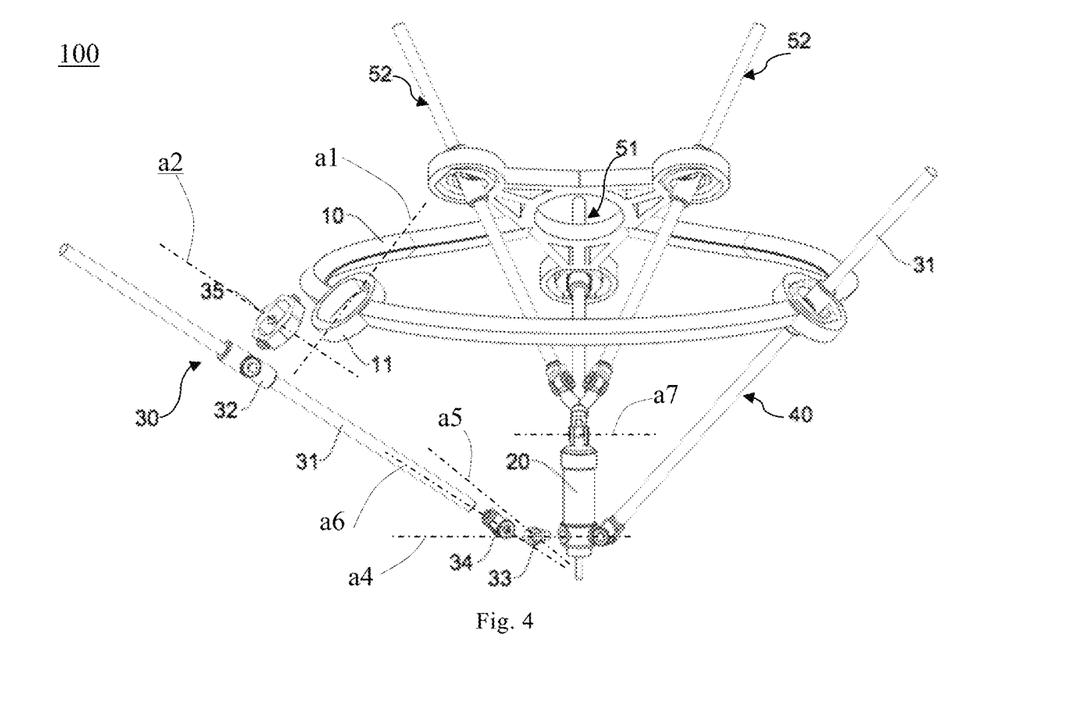
FIG. 4 is an exploded diagram of a first chain, a rack, and a movable platform of a five-degree-of-freedom parallel mechanism according to another embodiment of the present disclosure.

Referring to the embodiments shown in FIGS. 1, 2 and 4, each of the first chain 30 and the second chain 40 includes a first rod 31 and a first sleeve 32. The first rod 31 has one end connected with the movable platform 20 by three revolute pairs with axes a4, a5, a6 intersecting with one another and the other end connected with the rack 10 by two revolute pairs with axes a1, a2 intersecting with each other perpendicularly. The first sleeve 32 is fitted over the first rod 31 and connected with the rack 10 by two revolute pairs with axes intersecting with each other perpendicularly, in which the first rod 31 is movable along the first sleeve 32.

Specifically, the first sleeve 32 is fitted over the first rod 31, the first rod 31 is connected with the rack 10 by the first sleeve 32, the first sleeve 32 is connected with the rack 10 by the two revolute pairs with the axes intersecting with each other perpendicularly, and the first rod 31 is movable but not rotatable relative to the first sleeve 32. Thus, the two revolute pairs with the axes intersecting with each other perpendicularly are formed between the first rod 31 and the rack 10, resulting in a good rotational effect.

Further, as shown in FIG. 4, each of the first chain 30 and the second chain 40 further includes: a first collar 35 fitted over the first sleeve 32 and connected with the first sleeve 32 by a revolute pair. The rack 10 is provided with a first fixed ring, and the first collar 35 is provided in the first fixed ring and concentric with the first fixed ring. The first collar 35 is connected with the first fixed ring by a revolute pair. The first rod 31 is not rotatable relative to the first sleeve 32, the revolute pair is formed between the first sleeve 32 and the first collar 35, the first collar 35 and the first fixed ring form the revolute pair, and the first fixed ring is fixed at the rack 10. Thus, by providing the first collar 35 and the first fixed ring, two revolute pairs with axes intersecting with each other perpendicularly are formed between the first chain 30 and the rack 10 and between the second chin 40 and the rack 10, and the structure is simple and convenient to assemble and disassemble, and has a good rotational effect.

Optionally, hooke hinges can replace the two revolute pairs with the axes intersecting each other perpendicularly between the first chain 30 and the rack 10 and the two revolute pairs with the axes intersecting with each other perpendicularly between the second chain 40 and the rack 10.

Referring to the embodiment shown in FIG. 4, each of the first chain 30 and the second chain 40 further includes a first rotating member 33 and a first U-shaped connecting member 34. The first rotating member 33 is provided with a first pivot axis and a second pivot axis intersecting perpendicularly, and the first pivot axis is rotatably connected with the movable platform 20. The first U-shaped connecting member 34 has two legs rotatably connected with the second pivot axis, and the first U-shaped connecting member 34 is rotatably connected with the first rod 31.

Specifically, the first rod 31 is rotatable relative to the first U-shaped connecting member 34, with a rotational axis coaxial with a central axis of the first rod 31. The first U-shaped connecting member 34 is provided with the two legs rotatably connected with the first rotating member 33, and the axis around which the two legs rotate relative to the first rotating member 33 is the second pivot axis. The first rotating member 33 is rotatably connected with the movable platform 20, and the axis around which the first rotating member 33 rotates relative to the movable platform 20 is the first pivot axis. The first pivot axis intersects perpendicularly with a central axis of the movable platform, and the first pivot axis and the second pivot axis intersect with each other perpendicularly. Thus, by providing the first rotating member 33 and the first U-shaped connecting member 34, the three revolute pairs with the axes intersecting with one another are formed between the first rod 31 and the movable platform 20, resulting in a good rotational effect.

Optionally, spherical hinges can replace the three revolute pairs with the axes intersecting with one another between the first chain 30 and the movable platform 20 and the three revolute pairs with the axes intersecting with one another between the second chain 40 and the movable platform 20.

Figure 7:
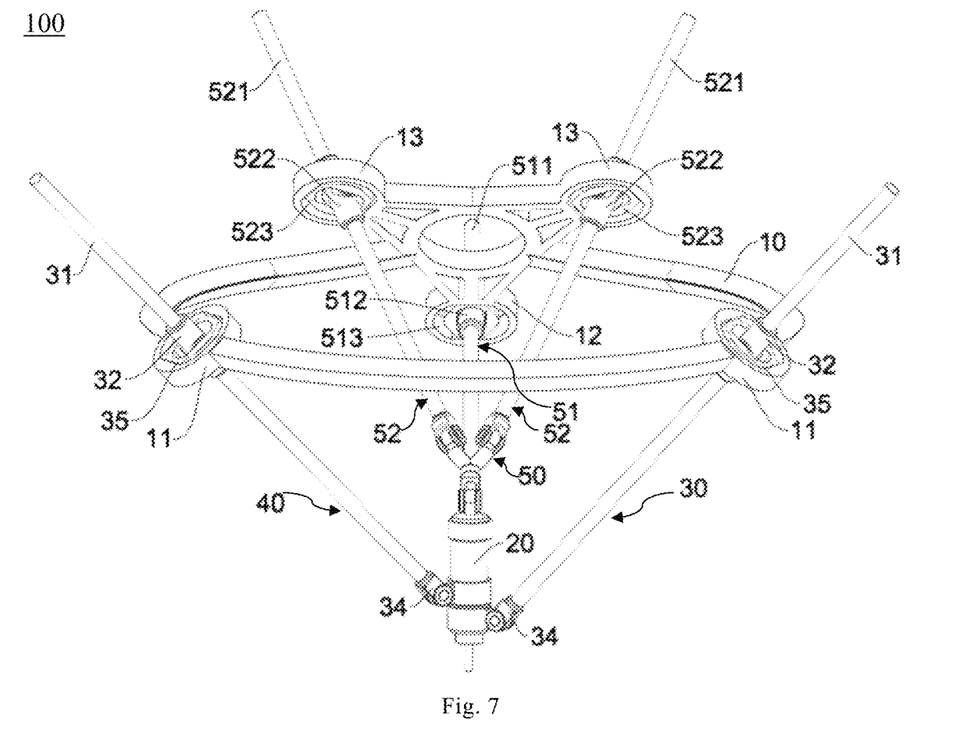
FIG. 7 is a schematic structural diagram of a five-degree-of-freedom parallel mechanism according to still another embodiment of the present disclosure.
Figure 8:
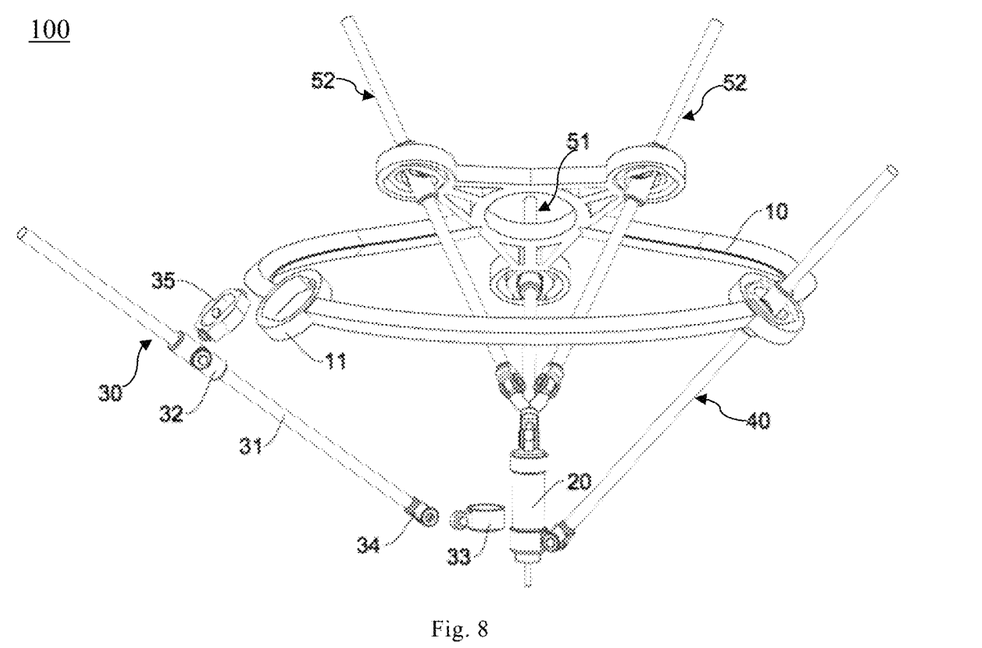
FIG. 8 is an exploded diagram of a first chain, a rack, and a movable platform of one structure of the five-degree-of-freedom parallel mechanism according to still another embodiment of the present disclosure.
Figure 9:
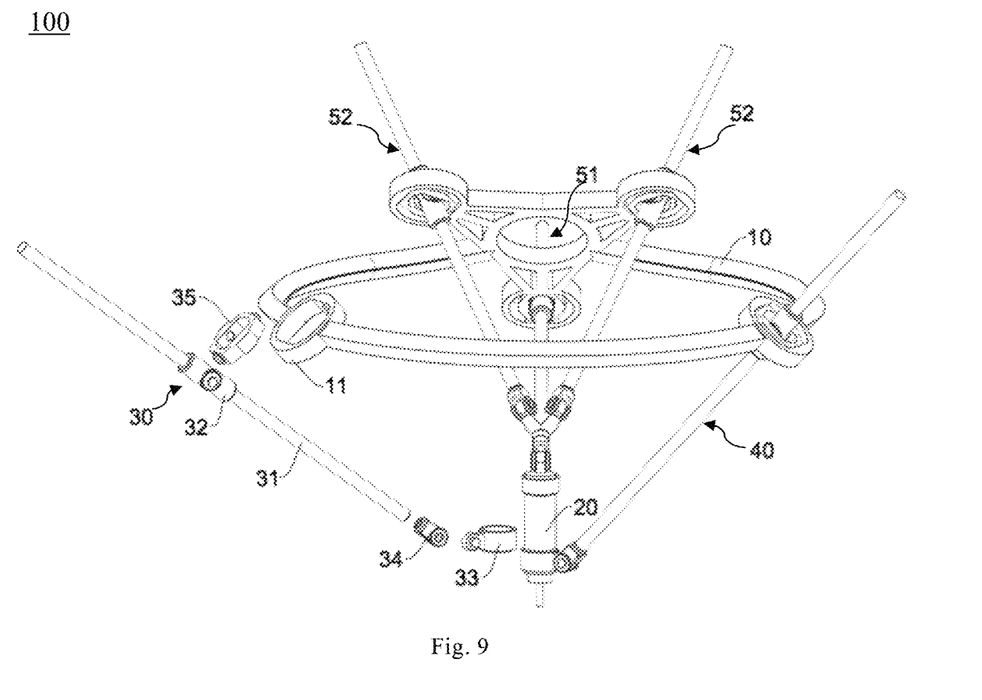
FIG. 9 is an exploded diagram of a first chain, a rack, and a movable platform of another structure of the five-degree-of-freedom parallel mechanism according to still another embodiment of the present disclosure.

It is worth noting that in the above two embodiments, the first pivot axis of the first rotating member 33 intersects perpendicularly with the central axis of the movable platform 20. According to still another embodiment of the present disclosure, as shown in FIGS. 7, 8 and 9, the first pivot axis of the first rotating member 33 can coincide with the central axis of the movable platform 20. That is, the first rotating member 33 can be fitted over the movable platform 20, be arranged coaxially with the movable platform 20, and be rotatable relative to the movable platform 20.

One embodiment of the main branch chain 51 of the third chain 50 according to the present disclosure will be described below.

As shown in FIGS. 1 and 2, the main branch chain 51 of the third chain 50 includes a second rod 511, a second sleeve 512, and a second collar 513.

The second rod 511 has one end connected with the movable platform 20 by a revolute pair (which defines a pivot axis a7, as shown in FIGS. 3 and 4) and the other end connected with the rack 10 by three revolute pairs with axes intersecting with one another. The second sleeve 512 is fitted over the second rod 511 and connected with the rack 10 by two revolute pairs with axes intersecting with each other perpendicularly, in which the second rod 511 is movable and rotatable along the second sleeve 512. The second collar 513 is fitted over the second sleeve 512 and connected with the second sleeve 512 by a revolute pair. The rack 10 is provided with a second fixed ring 12, and the second collar 513 is provided in the second fixed ring 12 and concentric with the second fixed ring 12 and is connected with the second fixed ring 12 by a revolute pair. Thus, three revolute pairs with axes intersecting with one another are formed between the second rod 511 and the rack 10, and the structure is simple and convenient to assemble and disassemble, and has a good rotational effect.

Optionally, spherical hinges can replace the three revolute pairs with the axes intersecting with one another between the main branch chain 51 and the rack 10.

One embodiment of the auxiliary branch chain 52 of the third chain 50 according to the present disclosure will be described below.

Figure 5:
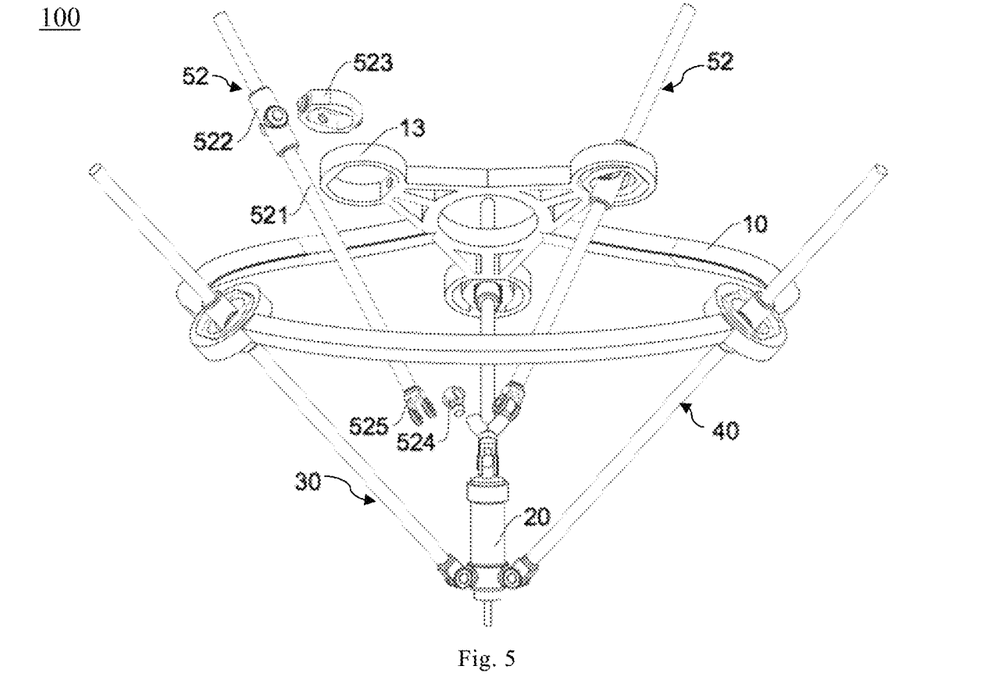
FIG. 5 is an exploded diagram of an auxiliary branch chain, a rack, and a movable platform of a five-degree-of-freedom parallel mechanism according to one embodiment of the present disclosure.

As shown in FIG. 5, according to one embodiment of the present disclosure, each auxiliary branch chain 52 of the third chain 50 includes a third rod 521 and a third sleeve 522.

The third rod 521 has one end connected with the second rod 511 by two revolute pairs with axes intersecting with each other perpendicularly and the other end connected with the rack 10 by three revolute pairs intersecting with one another.

The third sleeve 522 is fitted over the third rod 521 and connected with the rack 10 by two revolute pairs with axes intersecting with each other perpendicularly, in which the third rod 521 is movable and rotatable along the third sleeve 522. Thus, by providing the third sleeve 522, the third rod 521 can be connected with the rack 10 by three revolute pairs with axes intersecting with one another perpendicularly, and the structure is simple and convenient to assemble and disassemble, and has a good rotational effect.

Further, referring to the embodiment shown in FIG. 5, each auxiliary branch chain 52 of the third chain 50 further includes: a third collar 523 fitted over the third sleeve 522 and connected with the third sleeve 522 by a revolute pair. The rack 10 is provided with a third fixed ring 13, and the third collar 523 is provided in the third fixed ring 13 and concentric with the third fixed ring 13 and is connected with the third fixed ring 13 by a revolute pair. The auxiliary branch chain 52 is not rotatable relative to the third sleeve 522, a revolute pair is formed between the third sleeve 522 and the third collar 523, the third collar 523 and the third fixed ring 13 form a revolute pair, and the third fixed ring 13 is fixed at the rack 10. Thus, by providing the third collar 523 and the third fixed ring 13, three revolute pairs with axes intersecting with one another are formed between each auxiliary branch chain 52 and the rack 10.

As shown in FIG. 5, each auxiliary branch chain 52 further includes a third rotating member 524 and a third U-shaped connecting member 525. The third rotating member 524 is provided with a first pivot axis and a second pivot axis intersecting perpendicularly, and the first pivot axis is rotatably connected with the second rod 511. The third U-shaped connecting member 525 has two legs rotatably connected with the second pivot axis, and the third U-shaped connecting member 525 is fixedly connected with the third rod 521. Thus, two revolute pairs with axes perpendicular to each other are formed between the third rod 521 and the second rod 511, and brings about a good rotational effect.

Optionally, spherical hinges can replace the three revolute pairs with the axes intersecting with one another between the auxiliary branch chain 52 and the rack 10. Hooke hinges can replace the two revolute pairs with the axes intersecting with each other perpendicularly between the auxiliary branch chain 52 and the second rod 511.

Another embodiment of the auxiliary branch chain 52 of the third chain 50 according to the present disclosure will be described below.

Figure 6:
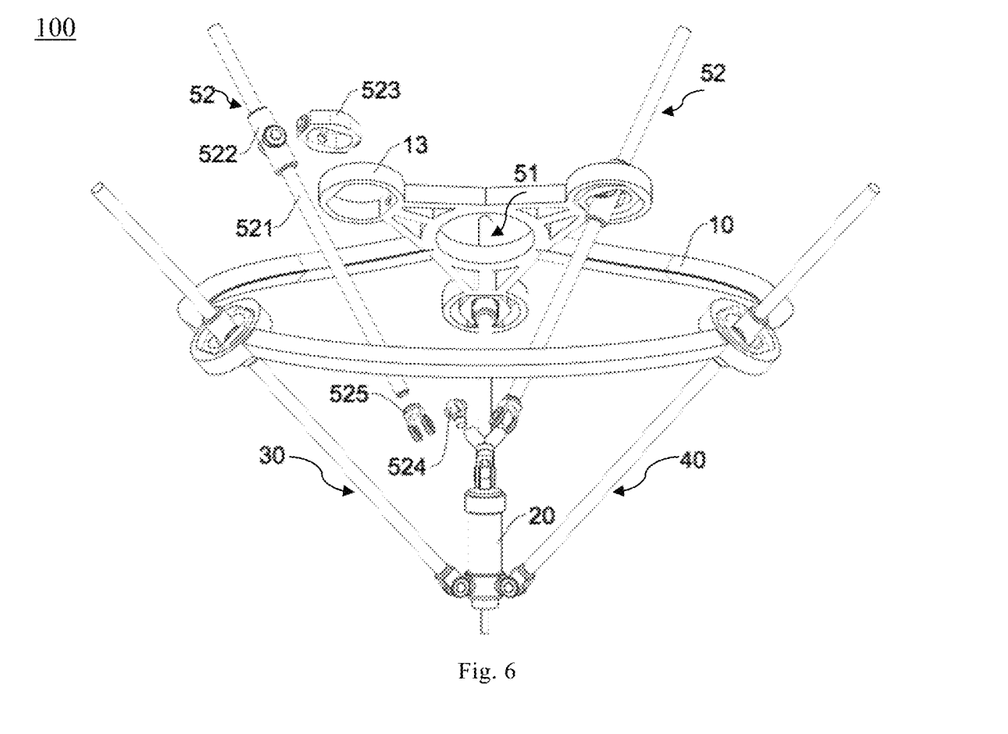
FIG. 6 is an exploded diagram of an auxiliary branch chain, a rack, and a movable platform of a five-degree-of-freedom parallel mechanism according to another embodiment of the present disclosure.

As shown in FIG. 6, according to another embodiment of the present disclosure, each auxiliary branch chain 52 of the third chain 50 includes a third rod 521 and a third sleeve 522.

The third rod 521 has one end connected with the second rod 511 by three revolute pairs with axes intersecting with one another and the other end connected with the rack 10 by two revolute pairs with axes intersecting with each other perpendicularly.

The third sleeve 522 is fitted over the third rod 521 and connected with the rack 10 by two revolute pairs with axes intersecting with each other perpendicularly, in which the third rod 521 is movable along the third sleeve 522. Thus, by providing the third sleeve 522, the third rod 521 can be connected with the rack 10 by two revolute pairs with axes intersecting with each other perpendicularly, and the rotational effect is excellent.

Further, referring to the embodiment shown in FIG. 6, each auxiliary branch chain 52 of the third chain 50 further includes: a third collar 523 fitted over the third sleeve 522 and connected with the third sleeve 522 by a revolute pair. The rack 10 is provided with a third fixed ring 13, and the third collar 523 is provided in the third fixed ring 13 and concentric with the third fixed ring 13 and is connected with the third fixed ring 13 by a revolute pair. Each auxiliary branch chain 52 is rotatable relative to the third sleeve 522, a revolute pair is formed between the third sleeve 522 and the third collar 523, the third collar 523 and the third fixed ring 13 form a revolute pair, and the third fixed ring 13 is fixed at the rack 10. Thus, by providing the third collar 523 and the third fixed ring 13, three revolute pairs with axes intersecting with one another are formed between each auxiliary branch chain 52 and the rack 10.

As shown in FIG. 6, each auxiliary branch chain 52 further includes a third rotating member 524 and a third U-shaped connecting member 525. The third rotating member 524 is provided with a first pivot axis and a second pivot axis intersecting perpendicularly, and the first pivot axis is rotatably connected with the second rod 511. The third U-shaped connecting member 525 has two legs rotatably connected with the second pivot axis, and is rotatably connected with the third rod 521. Thus, three revolute pairs with axes intersecting with one another perpendicularly are formed between the third rod 521 and the second rod 511, and bring about a good rotational effect.

Optionally, hooke hinges can replace the two revolute pairs with the axes intersecting with each other perpendicularly between the auxiliary branch chain 52 and the rack 10. Spherical hinges can replace the three revolute pairs with the axes intersecting with each other between the auxiliary branch chain 52 and the second rod 511.

It should be noted that the above-mentioned embodiments of the first chain 30 and the second chain 40 as well as the embodiments of the main branch chain 51 and the auxiliary branch chain 52 in the third chain 50 may be arranged and combined respectively. That is, when the first embodiment of the first and second chains 30, 40 is selected, the first or second embodiment of the auxiliary branch chain 52 in the third chain 50 may be selected. When the second embodiment of the first and second chains 30, 40 is selected, the first or second embodiment of the auxiliary branch chain 52 in the third chain 50 may be selected, so as to constitute a complete five-degree-of-freedom parallel mechanism 100.

Figure 10:
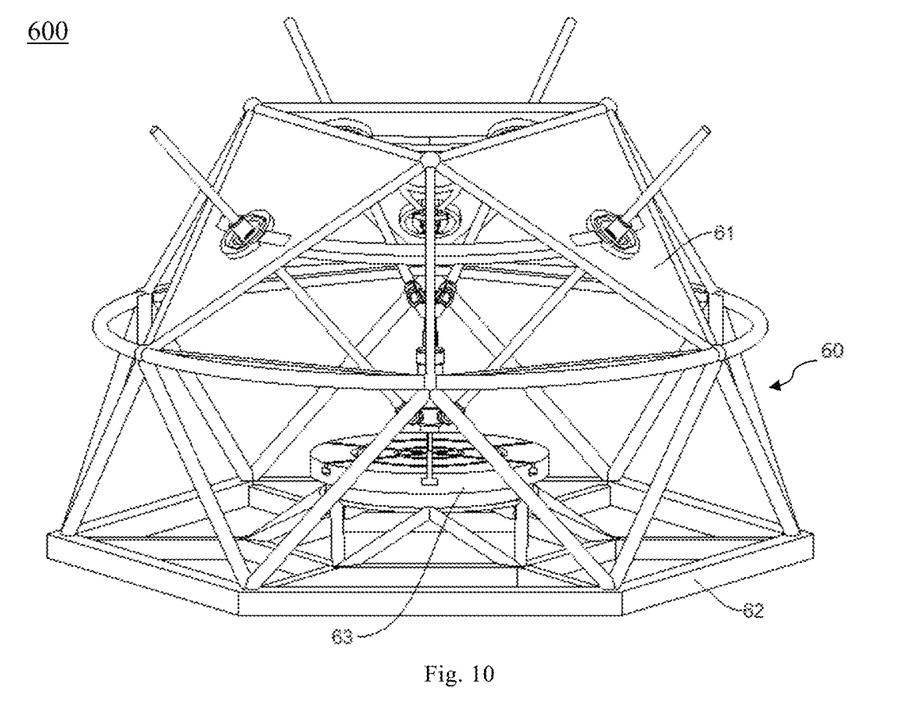
FIG. 10 illustrates multi-degree-of-freedom equipment according to one embodiment of the present disclosure.
Figure 11:
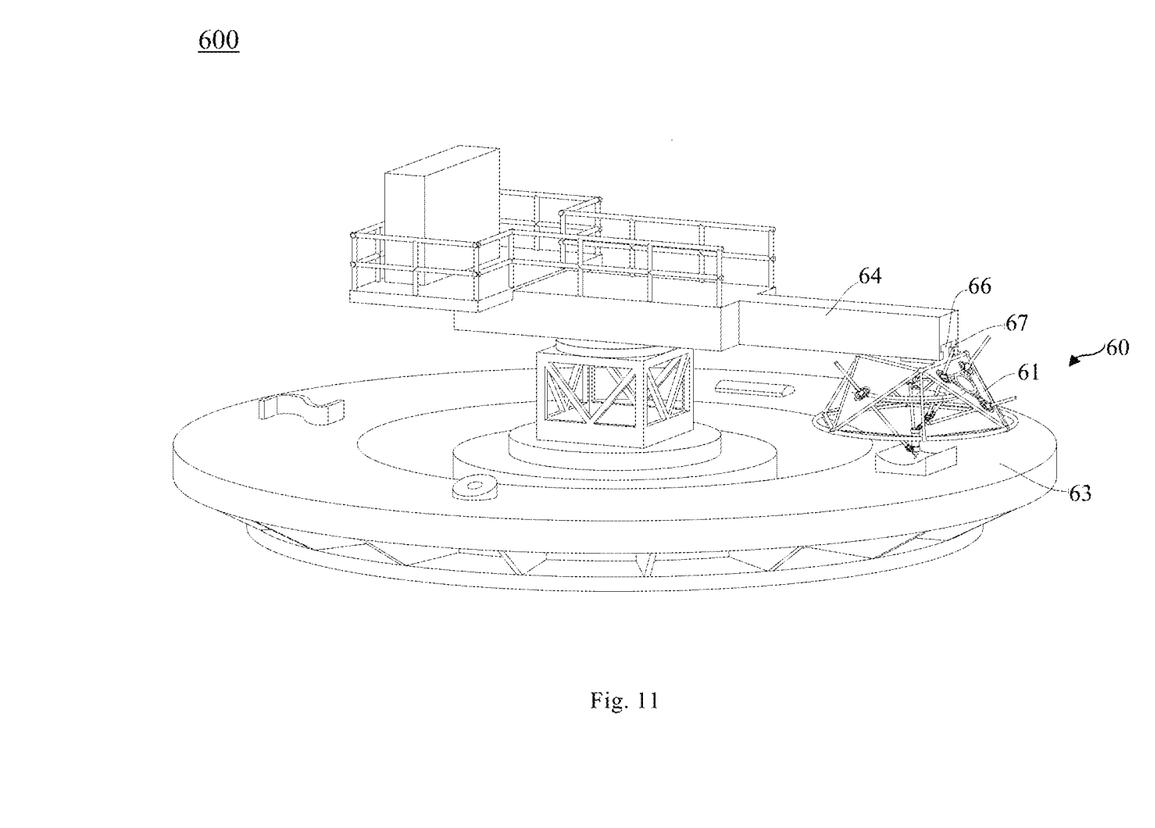
FIG. 11 illustrates multi-degree-of-freedom equipment according to another embodiment of the present disclosure.
Figure 12:
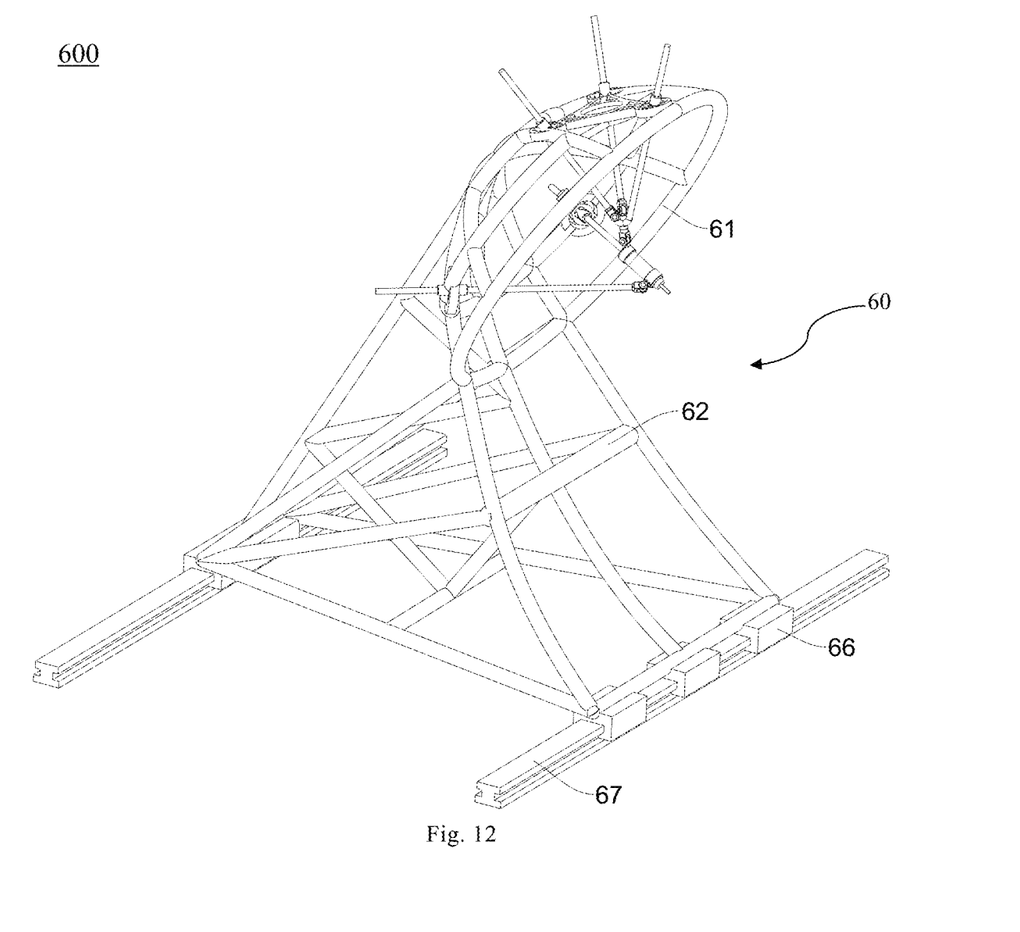
FIG. 12 illustrates multi-degree-of-freedom equipment according to still another embodiment of the present disclosure.

Multi-degree-of-freedom equipment 600 according to embodiments of a second aspect of the present disclosure will be described below with reference to FIGS. 10 to 12. As shown in FIGS. 10 to 12, the multi-degree-of-freedom equipment 600 according to the embodiment of the present disclosure includes: a mounting frame 60; and the five-degree-of-freedom parallel mechanism 100 according to the embodiments of the first aspect of the present disclosure, provided on the mounting frame 60. The mounting frame 60 is connected with the parallel mechanism 100 in series to enable the movable platform of the five-degree-of-freedom parallel mechanism to obtain more than five degrees of freedom.

Thus, by providing the parallel mechanism 100 on the mounting frame 60, and connecting the mounting frame 60 with the parallel mechanism 100 in series to realize the linkage, the movable platform 20 of the parallel mechanism 100 has more degrees of freedom. That is, the movable platform 20 of the parallel mechanism 100 originally has five degrees of freedom, and when provided on the mounting frame 60, the movable platform 20 can have six, seven or more degrees of freedom, such that the parallel mechanism 100 can move more freely. The five-degree-of-freedom parallel mechanism 100 according to the embodiments of the present disclosure can be developed into a series-parallel structure device with multiple (more than or equal to six) degrees of freedom, such that the multi-degree-of-freedom equipment 600 according to the embodiments of the present disclosure can machine complex components and parts as well as large structural parts and implement multi-degree-of-freedom numerical control machining, such as offsite maintenance of large equipment.

The multi-degree-of-freedom equipment 600 according to the embodiments of the present disclosure will be described in detail below with reference to FIGS. 10 to 12.

According to one embodiment of the present disclosure, as shown in FIG. 10, the multi-degree-of-freedom equipment 600 includes a mounting frame 60 and the five-degree-of-freedom parallel mechanism 100 according to the embodiments of the first aspect of the present disclosure. The mounting frame 60 includes a frame structure 61 and a floor stand 62. The topological principle of the frame structure 61 is derived from a regular icosahedron structure.

Further, the mounting frame 60 of the multi-degree-of-freedom equipment 600 further includes: a revolving platform 63 provided below the frame structure 61 and in the floor stand 62. The revolving platform 63 is rotatable around a vertical axis, and such rotation is driven actively. A workpiece to be machined can be fixed at the revolving platform 63. Through the coordinated linkage between the revolving platform 63 and the five-degree-of-freedom parallel mechanism 100, the movable platform 20 can realize up to six degrees of freedom. Thus, the multi-degree-of-freedom equipment 600 can implement multi-degree-of-freedom numerical control machining of complex components and parts.

According to another embodiment of the present disclosure, as shown in FIG. 11, the multi-degree-of-freedom equipment 600 includes a mounting frame 60 and the five-degree-of-freedom parallel mechanism 100 according to the embodiments of the first aspect of the present disclosure. The mounting frame 60 includes a frame structure 61, a slide block 66, a slide rail 67, a cantilever supporting beam 64, and a revolving platform 63. The frame structure 61 is fixedly connected with the slide block 66, the slide block 66 can move in a direction of the slide rail 67, and the slide rail 67 is fixedly connected at the cantilever supporting beam 64. The cantilever supporting beam 64 is provided at the revolving platform 63, the revolving platform 63 is rotatable around a vertical direction, and the rotation of the revolving platform 63 around the vertical direction and the movement of the slide block 66 along the slide rail 67 are both driven actively. By means of the rotation of the revolving platform 63, the movement between the slide block 66 and the slide rail 67, and the coordinated linkage of the five-degree-of-freedom parallel mechanism 100, the movable platform 20 can realize multiple degrees of freedom. Thus, the multi-degree-of-freedom equipment can implement the multi-degree-of-freedom numerical control operation, such as the machining and maintenance of large annular structural parts (such as a flange structural part 65 in FIG. 11).

According to still another embodiment of the present disclosure, as shown in FIG. 12, the multi-degree-of-freedom equipment 600 includes a mounting frame 60 and the five-degree-of-freedom parallel mechanism 100 according to the embodiments of the first aspect of the present disclosure. The mounting frame 60 includes a frame structure 61, a floor stand 62, a slide block 66, and a slide rail 67. The topological principle of the frame structure 61 is derived from a spherical structure. The frame structure 61 is fixedly connected with the floor stand 62, a bottom of the floor stand 62 is fixedly connected with the slide block 66, and the slide block 66 is movable in a direction of the slide rail 67, in which such movement is driven actively. By means of the movement between the slide block 66 and the slide rail 67 and the coordinated linkage of the five-degree-of-freedom parallel mechanism 100, the movable platform 20 can realize up to six degrees of freedom. The multi-degree-of-freedom equipment 600 has the advantages of light weight and portability, and hence can implement the multi-degree-of-freedom numerical control machining, such as offsite maintenance of large equipment.

In the description of the present specification, reference throughout this specification to "an embodiment," "some embodiments," "an exemplary embodiment," "an example," "a specific example," "some examples" or the like means that a particular feature, structure, material, or characteristic described in connection with the embodiment or example is included in at least one embodiment or example of the present disclosure. In the specification, the appearances of the above-mentioned terms are not necessarily referring to the same embodiment or example. Furthermore, the particular features, structures, materials, or characteristics described can be combined in any suitable manner in one or more embodiments or examples.

Although embodiments of the present disclosure have been shown and illustrated, it shall be understood by those skilled in the art that various changes, modifications, alternatives, and variants can be made in the embodiments without departing from the principles and purposes of the present disclosure. The scope of the present application is defined by claims and their equivalents.

The invention claimed is:

1. A five-degree-of-freedom parallel mechanism, comprising:
   a rack;
   a movable platform;
   a first chain connected with the rack by at least two revolute pairs with axes intersecting with each other perpendicularly, and connected with the movable platform by at least two revolute pairs with axes intersecting with each other perpendicularly;
   a second chain having the same structure as the first chain, and connected with the rack by at least two revolute pairs with axes intersecting with each other perpendicularly and connected with the movable platform by at least two revolute pairs with axes perpendicular to each other; and
   a third chain comprising a main branch chain and two auxiliary branch chains, wherein the main branch chain is connected with the movable platform by a revolute pair and connected with the rack by three revolute pairs with axes intersecting with one another, and each of the auxiliary branch chains is connected with the main branch chain by at least two revolute pairs with axes intersecting with each other perpendicularly and connected with the rack by at least two revolute pairs with axes intersecting with each other perpendicularly,
   wherein the first chain, the second chain, and the third chain are separately connected between the rack and the movable platform, and constitute, together with the rack and the movable platform, a spatial parallel mechanism that enables the movable platform to realize three rotational degrees of freedom and two movement degrees of freedom,
   wherein each of the first chain and the second chain comprises:
      a first rod having one end connected with the movable platform and the other end connected with the rack;
      a first rotating member provided with a first pivot axis and a second pivot axis perpendicular to each other, the first pivot axis being rotatably connected with the movable platform; and
      a first U-shaped connecting member having two legs rotatably connected with the second pivot axis, the first rod being fixedly or rotatably connected with the first U-shaped connecting member.

2. The five-degree-of-freedom parallel mechanism according to claim 1, wherein each of the first chain and the second chain further comprises:
   a first sleeve fitted over the first rod and connected with the rack by two revolute pairs of the at least two revolute pairs with axes intersecting with each other perpendicularly, wherein the first rod is movable and rotatable along the first sleeve,
   wherein one end of the first rod is connected with the movable platform by two revolute pairs of the at least two revolute pairs and the other end of the first rod is connected with the rack by three revolute pairs with axes intersecting each other.

3. The five-degree-of-freedom parallel mechanism according to claim 2, further comprising:
   a first collar fitted over the first sleeve and connected with the first sleeve by one revolute pair of the at least two revolute pairs, the rack being provided with a first fixed ring, the first collar being provided in the first fixed ring and concentric with the first fixed ring, and the first collar being connected with the first fixed ring by one revolute pair of the at least two revolute pairs.

4. The five-degree-of-freedom parallel mechanism according to claim 1, wherein each of the first chain and the second chain further comprises:
   a first sleeve fitted over the first rod and connected with the rack by two revolute pairs of the at least two revolute pairs with axes intersecting with each other perpendicularly, wherein the first rod is movable along the first sleeve,
   wherein one end of the first rod is connected with the movable platform by three revolute pairs and the other end of the first rod is connected with the rack by two revolute pairs of the at least two revolute pairs with axes intersecting each other perpendicularly.

5. The five-degree-of-freedom parallel mechanism according to claim 1, wherein the main branch chain in the third chain comprises:
a second rod having one end connected with the movable platform by the revolute pair and the other end connected with the rack by the three revolute pairs with axes intersecting with one another;
a second sleeve fitted over the second rod and connected with the rack by two revolute pairs of the three revolute pairs with axes intersecting with each other perpendicularly, wherein the second rod is movable and rotatable along the second sleeve; and
a second collar fitted over the second sleeve and connected with the second sleeve by one revolute pair of the two revolute pairs, wherein the rack is provided with a second fixed ring, and the second collar is provided in the second fixed ring and concentric with the second fixed ring and is connected with the second fixed ring by another revolute pair of the two revolute pairs.

6. The five-degree-of-freedom parallel mechanism according to claim 1, wherein each of the auxiliary branch chains in the third chain comprises:
a third rod having one end connected with the second rod by two revolute pairs of the at least two revolute pairs with axes intersecting with each other perpendicularly and the other end connected with the rack by three revolute pairs intersecting with one another; and
a third sleeve fitted over the third rod and connected with the rack by two revolute pairs of the at least two revolute pairs with axes intersecting with each other perpendicularly, wherein the third rod is movable and rotatable along the third sleeve.

7. The five-degree-of-freedom parallel mechanism according to claim 6, further comprising:
a third collar fitted over the third sleeve and connected with the third sleeve by one revolute pair of the at least two revolute pairs, the rack being provided with a third fixed ring, and the third collar being provided in the third fixed ring and concentric with the third sleeve and being connected with the third sleeve by one revolute pair of the at least two revolute pairs.

8. The five-degree-of-freedom parallel mechanism according to claim 1, wherein each of the auxiliary branch chains in the third chain comprises:
a third rod having one end connected with the second rod by three revolute pairs with axes intersecting with one another and the other end connected with the rack by two revolute pairs of the at least two revolute pairs with axes intersecting with each other perpendicularly; and
a third sleeve fitted over the third rod and connected with the rack by two revolute pairs of the at least two revolute pairs with axes intersecting with each other perpendicularly, wherein the third rod is movable along the third sleeve.

9. Multi-degree-of-freedom equipment, comprising:
a mounting frame; and
a five-degree-of-freedom parallel mechanism, provided on the mounting frame, and comprising:
a rack;
a movable platform;
a first chain connected with the rack by at least two revolute pairs with axes intersecting with each other perpendicularly, and connected with the movable platform by at least two revolute pairs with axes intersecting with each other perpendicularly;
a second chain having the same structure as the first chain, and connected with the rack by at least two revolute pairs with axes intersecting with each other perpendicularly and connected with the movable platform by at least two revolute pairs with axes perpendicular to each other; and
a third chain comprising a main branch chain and two auxiliary branch chains, wherein the main branch chain is connected with the movable platform by a revolute pair and connected with the rack by three revolute pairs with axes intersecting with one another, and each of the auxiliary branch chains is connected with the main branch chain by at least two revolute pairs with axes intersecting with each other perpendicularly and connected with the rack by at least two revolute pairs with axes intersecting with each other perpendicularly,
wherein the first chain, the second chain, and the third chain are separately connected between the rack and the movable platform, and constitute, together with the rack and the movable platform, a spatial parallel mechanism that enables the movable platform to realize three rotational degrees of freedom and two movement degrees of freedom,
wherein each of the first chain and the second chain comprises:
a first rod having one end connected with the movable platform and the other end connected with the rack;
a first rotating member provided with a first pivot axis and a second pivot axis perpendicular to each other, the first pivot axis being rotatably connected with the movable platform; and
a first U-shaped connecting member having two legs rotatably connected with the second pivot axis, the first rod being fixedly or rotatably connected with the first U-shaped connecting member,
wherein the mounting frame is connected with the parallel mechanism in series to constitute the multi-degree-of-freedom equipment, so as to enable the movable platform to obtain more than five degrees of freedom.

10. The multi-degree-of-freedom equipment according to claim 9, further comprising:
a third collar fitted over the third sleeve and connected with the third sleeve by one revolute pair of the at least two revolute pairs, the rack being provided with a third fixed ring, and the third collar being provided in the third fixed ring and concentric with the third sleeve and being connected with the third sleeve by one revolute pair of the at least two revolute pairs.

11. The multi-degree-of-freedom equipment according to claim 9, wherein each of the first chain and the second chain further comprises:
a first sleeve fitted over the first rod and connected with the rack by two revolute pairs of the at least two revolute pairs with axes intersecting with each other perpendicularly, wherein the first rod is movable and rotatable along the first sleeve,
wherein one end of the first rod is connected with the movable platform by two revolute pairs of the at least two revolute pairs and the other end of the first rod is connected with the rack by three revolute pairs with axes intersecting with each other.

12. The multi-degree-of-freedom equipment according to claim 11, further comprising:

a first collar fitted over the first sleeve and connected with the first sleeve by one revolute pair of the at least two revolute pairs, the rack being provided with a first fixed ring, the first collar being provided in the first fixed ring and concentric with the first fixed ring, and the first collar being connected with the first fixed ring by one revolute pair of the at least two revolute pairs.

13. The multi-degree-of-freedom equipment according to claim 9, wherein each of the first chain and the second chain further comprises:
a first sleeve fitted over the first rod and connected with the rack by two revolute pairs of the at least two revolute pairs with axes intersecting with each other perpendicularly, wherein the first rod is movable along the first sleeve,
wherein one end of the first rod is connected with the movable platform by three revolute pairs and the other end of the first rod is connected with the rack by two revolute pairs of the at least two revolute pairs with axes intersecting each other perpendicularly.

14. The multi-degree-of-freedom equipment according to claim 9, wherein the main branch chain in the third chain comprises:
a second rod having one end connected with the movable platform by the revolute pair and the other end connected with the rack by the three revolute pairs with axes intersecting with one another;
a second sleeve fitted over the second rod and connected with the rack by two revolute pairs of the three revolute pairs with axes intersecting with each other perpendicularly, wherein the second rod is movable and rotatable along the second sleeve; and
a second collar fitted over the second sleeve and connected with the second sleeve by one revolute pair of the two revolute pairs, wherein the rack is provided with a second fixed ring, and the second collar is provided in the second fixed ring and concentric with the second fixed ring and is connected with the second fixed ring by another revolute pair of the two revolute pairs.

15. The multi-degree-of-freedom equipment according to claim 9, wherein each of the auxiliary branch chains in the third chain comprises:
a third rod having one end connected with the second rod by two revolute pairs of the at least two revolute pairs with axes intersecting with each other perpendicularly and the other end connected with the rack by three revolute pairs intersecting with one another; and
a third sleeve fitted over the third rod and connected with the rack by two revolute pairs of the at least two revolute pairs with axes intersecting with each other perpendicularly, wherein the third rod is movable and rotatable along the third sleeve.

16. The multi-degree-of-freedom equipment according to claim 9, wherein each of the auxiliary branch chains in the third chain comprises:
a third rod having one end connected with the second rod by three revolute pairs with axes intersecting with one another and the other end connected with the rack by two revolute pairs of the at least two revolute pairs with axes intersecting with each other perpendicularly; and
a third sleeve fitted over the third rod and connected with the rack by two revolute pairs of the at least two revolute pairs with axes intersecting with each other perpendicularly, wherein the third rod is movable along the third sleeve.

* * * * *